(12) United States Patent
Hida et al.

(10) Patent No.: US 7,234,078 B2
(45) Date of Patent: Jun. 19, 2007

(54) DATA RECOVERY METHOD AND DATA RECORDING APPARATUS

(75) Inventors: Yoichi Hida, Saijo (JP); Taisuke Tsurui, Niihama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 554 days.

(21) Appl. No.: 10/900,314

(22) Filed: Jul. 28, 2004

(65) Prior Publication Data

US 2005/0028031 A1 Feb. 3, 2005

(30) Foreign Application Priority Data

Jul. 28, 2003 (JP) .............................. 2003-280532

(51) Int. Cl.
*G06F 11/00* (2006.01)
(52) U.S. Cl. ......................................... 714/15; 717/170
(58) Field of Classification Search .................... 714/5, 714/15; 717/168, 170
See application file for complete search history.

(56) References Cited

U.S. PATENT DOCUMENTS

| | | | | |
|---|---|---|---|---|
| 5,579,522 A | * | 11/1996 | Christeson et al. ............ 713/2 |
| 5,974,546 A | * | 10/1999 | Anderson ...................... 713/2 |
| 6,167,532 A | * | 12/2000 | Wisecup ....................... 714/23 |
| 6,374,265 B1 | * | 4/2002 | Chen et al. ................... 707/204 |
| 6,536,038 B1 | * | 3/2003 | Ewertz et al. ............... 717/168 |
| 7,093,244 B2 | * | 8/2006 | Lajoie et al. ................ 717/168 |
| 2002/0170050 A1 | * | 11/2002 | Fiorella et al. .............. 717/168 |
| 2002/0188837 A1 | * | 12/2002 | Dayan et al. ................... 713/2 |
| 2003/0208338 A1 | * | 11/2003 | Challener et al. ........... 702/186 |
| 2003/0217227 A1 | * | 11/2003 | Parthasarathy et al. ...... 711/118 |
| 2004/0040020 A1 | * | 2/2004 | Yang ........................... 717/168 |
| 2004/0044837 A1 | * | 3/2004 | Hasbun et al. .............. 711/103 |
| 2004/0237068 A1 | * | 11/2004 | Ren ............................ 717/110 |
| 2005/0240756 A1 | * | 10/2005 | Mayer ........................... 713/2 |

FOREIGN PATENT DOCUMENTS

JP 2002063057 A 2/2002

* cited by examiner

*Primary Examiner*—Bryce P. Bonzo
(74) *Attorney, Agent, or Firm*—Steptoe & Johnson LLP

(57) ABSTRACT

Information about the address of file information in a storage device and file information containing an updated version of the file information is recorded in different areas in the storage device before the file is updated, determination is made as to whether or not the information can be read successfully from the storage device (steps 202 and 204), and based on the determination, determination is made as to whether or not data recovery should be performed and, if data recovery should be performed (steps 201 and 203), data successfully read from the storage device is used to record the data in a sector indicated by the address information (step 205).

24 Claims, 8 Drawing Sheets

FIG. 8

| FILE NAME | Data 1 |
|---|---|
| ENTRY CLUSTER NUMBER | 0002 |
| DATA SIZE | 100KB |
| ATTRIBUTE | WRITABLE |
| TIME STAMP | 02/12/10:12:03 |
| SECTOR NUMBER | 200 |
| FLAG | 1 |

801 — SECTOR NUMBER
802 — FLAG

DATA RECOVERY METHOD AND DATA RECORDING APPARATUS

FIELD OF THE INVENTION

The present invention relates to a data recovery method and a data recording apparatus that recovers data recorded as a file on a storage medium.

BACKGROUND OF THE INVENTION

Recording apparatuses having a recording medium such as a semiconductor memory, magnetic disk, magneto-optical disk, and an optical disk have been widely used as recording apparatuses for recording information in computer systems such as personal computers.

If data is recorded on a recording apparatus capable of random access such as a hard disk drive (HDD) which uses a magnetic disk as its recording medium, the data is not recorded in contiguous areas on the recording medium, but instead, is recorded in clusters, which are the smallest recording units. In the recording apparatus, a file system is used in which a directory entry containing file names and the cluster number of the first piece of data scattered in pieces in the recording apparatus and a file allocation table (FAT) which identifies the order of the pieces of scattered data are used to manage files recorded on the recording apparatus.

A file system which has been used for managing files recorded on such a recording apparatus will be described below.

FIG. 7 shows a configuration of a FAT file system. As shown in FIG. 7, provided in a recording apparatus is a file system including directory entries 701 of a root directory, which are information containing the filenames of recorded files and the starting cluster number of scattered data, clusters 703 which are the smallest recording units for storing real data, and a FAT 702 indicating information about the links between clusters 703 constituting a file. In the example shown in FIG. 7, the directory entry 701 indicates that a file, Data 1, is stored in clusters starting with cluster number 0002 on this recording apparatus. The FAT 702 indicates that the data in Data 1 is arranged in the order of cluster numbers 0002, 0003, and 0004 and the real data in Data 1 is recorded in the areas associated with cluster numbers 0002, 0003, and 0004 of the clusters 703. The FAT 702 also indicates that another file, Data 2 is stored only in the area associated with cluster number 0006.

When a file is created in the recording apparatus, its filename and the starting cluster number are entered in a directory entry 701 of the root directory and information about the links between clusters 703 in the FAT 702 is updated as real data is recorded in each area of the clusters 703. When a file is deleted from the recording apparatus, a portion corresponding to the file to be deleted from the directory entry 701 is set as "Unused" and the link information in the FAT 702 is set as unused in the order in which the clusters are linked.

In this way, each time a file operation is performed on the recording apparatus, the FAT 702 and a directory entry 701 are updated. Therefore, if a power failure causes a file operation to be aborted without performing a normal procedure, the FAT 702 and the directory entry 701 are corrupted, resulting in file corruption and data loss.

In a FAT file system, two file allocation tables 702 with the same size are originally provided so that, in the event that one of them is corrupted, data can be copied from the other to recover file information. The directory entry 701, on the other hand, is not duplicated. Accordingly, in case the directory entry 701 is corrupted, a corrupted file or lost data can never be recovered.

Therefore, a data recovery method as disclosed in Japanese Patent Laid-Open No. 2002-63057 (paragraphs [0001] and [0002] and FIGS. 4 and 5) has been proposed for enabling data to be recovered even if a directory entry 701 is corrupted. In that method, a temporary index as shown in FIG. 8 is created and recorded in a recording apparatus before a directory entry and a FAT are updated and, once an update of the directory entry and the FAT has been completed successfully, the temporary index is deleted from the recording apparatus.

In FIG. 8, reference number 801 denotes a sector number indicating a recording location in the directory entry 701 in the recording apparatus and 802 denotes a flag indicating whether the directory entry 701 and the FAT 702 are being updated. The remaining information items are information originally contained in the directory entry 701.

In the vent a file operation is aborted due to a power failure for example, determination is made during restarting as to whether a temporary index is present or not. If a temporary index is found, data in the temporary index is compared with its corresponding data in the directory entry 701 for recovering the directory entry 701.

According to such a prior-art data recovery method, an abort of a write of data about the size of one sector to a recording apparatus is neglected because of its smallness. This method has a problem that, if a write operation is aborted due to a power failure for example, the temporary index cannot successfully be read during restarting and therefore a recovery process cannot be performed, because determination as to whether or not a recovery process should be performed is made based on a flag in the temporary index.

Another problem with the method is that the temporary index is deleted after a successful update of a directory entry for recovering data and therefore, if file operations are frequently performed, temporary index delete operations are also performed frequently and thus time spent for file update processing is increased.

DISCLOSURE OF THE INVENTION

The present invention solves the problems of the prior art and provides a data recovery method and a data recording apparatus that can readily and reliably recover a directory entry if a write to a recording apparatus is aborted, and can minimize an increase in update processing time even if file operations are frequently performed.

According to the present invention, there is provided a data recovery method for recovering data recorded as a file on a storage device, including the steps of: managing the file recorded on the storage device by using a plurality of pieces of data constituting the file, file information including a file name and information about the location in which starting data of the data in the storage device, and a table for identifying the order of the data; before the file is updated, recording in a predetermined area of the storage device the address of the file information in the storage device and information including an updated version of the file information; when the storage device is restarted, reading the address from the predetermined area in the storage device which has been recorded on the storage device before the update of the file information; determining whether or not the address has been successfully read; reading data recorded in an area on the storage device that is pointed to by the address; determining whether or not the data has been successfully read; and overwriting the area pointed to by the address in the storage device with the information including the updated version of the file information recorded on the storage device to recover the file information.

According to the present invention, there is provided a data recording apparatus that recovers data recorded as a file on a storage device, including: a data backup unit which manages the file recorded on the storage device by using a plurality of pieces of data constituting the file, file information including a file name and information about the location in which starting data of the data in the storage device, and a table for identifying the order of the data and, before the file is updated, records in a predetermined area of the storage device the address of the file information in the storage device and information including an updated version of the file information; and a data recovery instructing unit which, in response to detecting that the storage device is restarted, reads the address from the predetermined area in the storage device which has been recorded on the storage device before the update of the file information, determines whether or not the address has been successfully read, reads data recorded in an area on the storage device that is pointed to by the address, determines whether or not the data has been successfully read; and overwrites the area pointed to by the address in the storage device with the information including the updated version of the file information recorded on the storage device to recover the file information.

As described above, before file information is updated, the address at which the file information is recorded and an updated version of the file information are recorded in predetermined different areas in the storage device, determination based on whether the information has been successfully read from the storage device or not is made as to whether recovery of the file information should be performed and, if recovery of the file information should be performed, the file information successfully read from the storage device can be recorded in a sector indicated by the address information.

Thus, if the file information is corrupted due to an unexpected abort of updating of the file information due to an instantaneous outage, such as power failure while the file information is being written, the file information can be recovered readily and reliably.

Furthermore, data required for data recovery is recorded in the storage device only once when the file information is updated and the need for deleting a temporary index can be eliminated and therefore the need for deletion of that data can also be eliminated.

Consequently, even if file operations are frequently performed for data recovery, an increase in update processing time which would otherwise be caused due to temporary index deletion can be prevented.

BRIEF DESCRIPTION OF THE DRAWINGS

FIG. 8 is a structural drawing showing a concept of a temporary index used with a data update process in the data recovery method according to the prior art.

DESCRIPTION OF THE EMBODIMENTS

A data recovery method and a data recording apparatus according to embodiments of the present invention will be described below in detail with reference to the accompanying drawings.

First Embodiment

A data recovery method according to a first embodiment of the present invention will be described.

Figure 1:
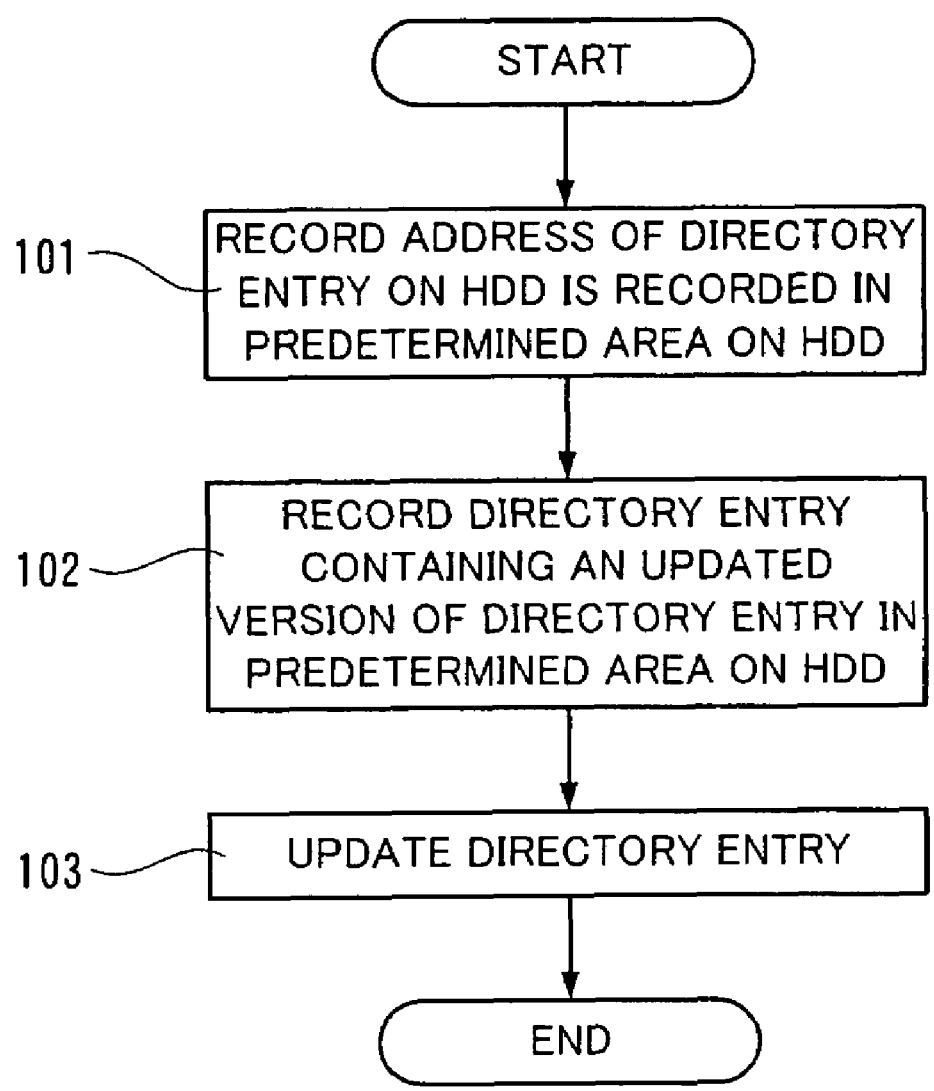
FIG. 1 is a flowchart showing a process for updating a directory entry in a FAT file system using a data recovery method according to a first embodiment of the present invention.
Figure 2:
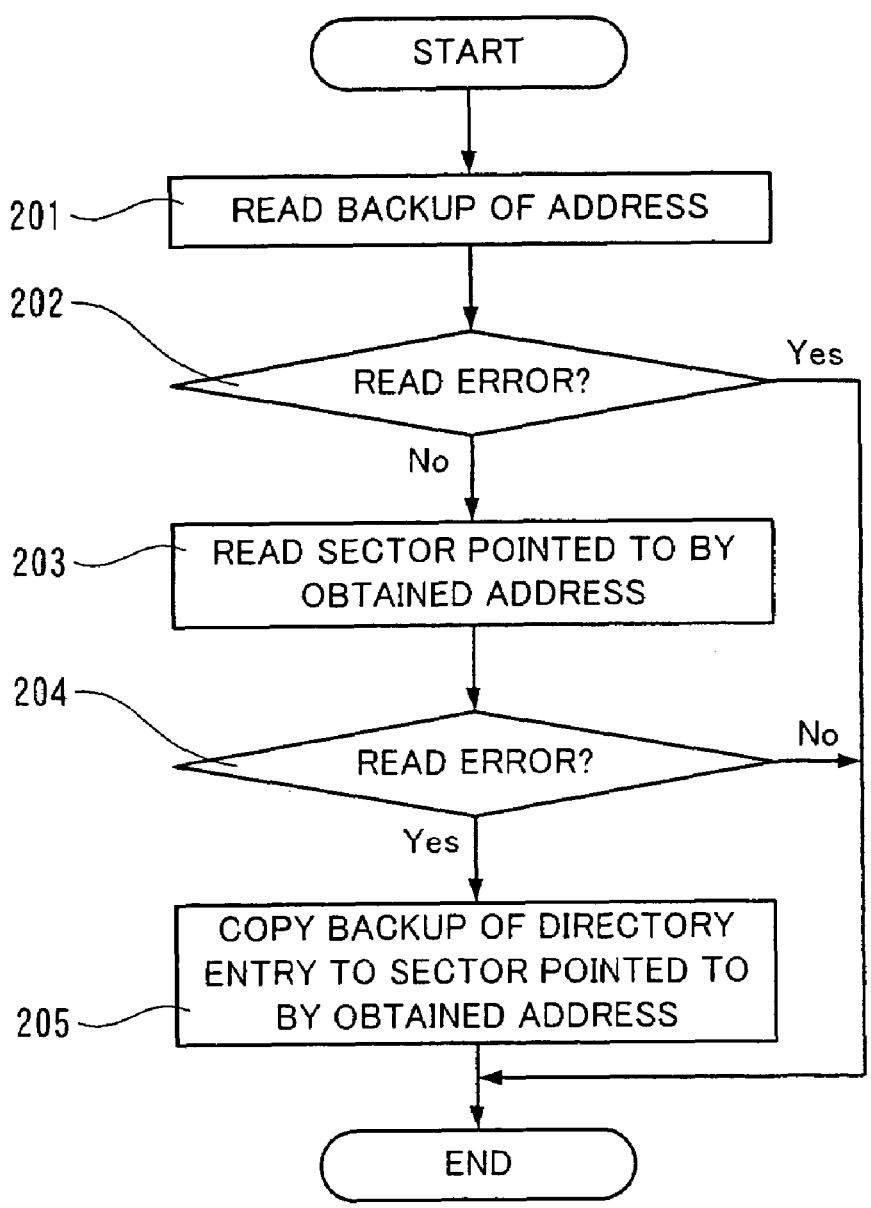
FIG. 2 is a flowchart showing a process for recovering the directory entry in the FAT file system using the data recovery method according to the first embodiment of the present invention.
Figure 3:
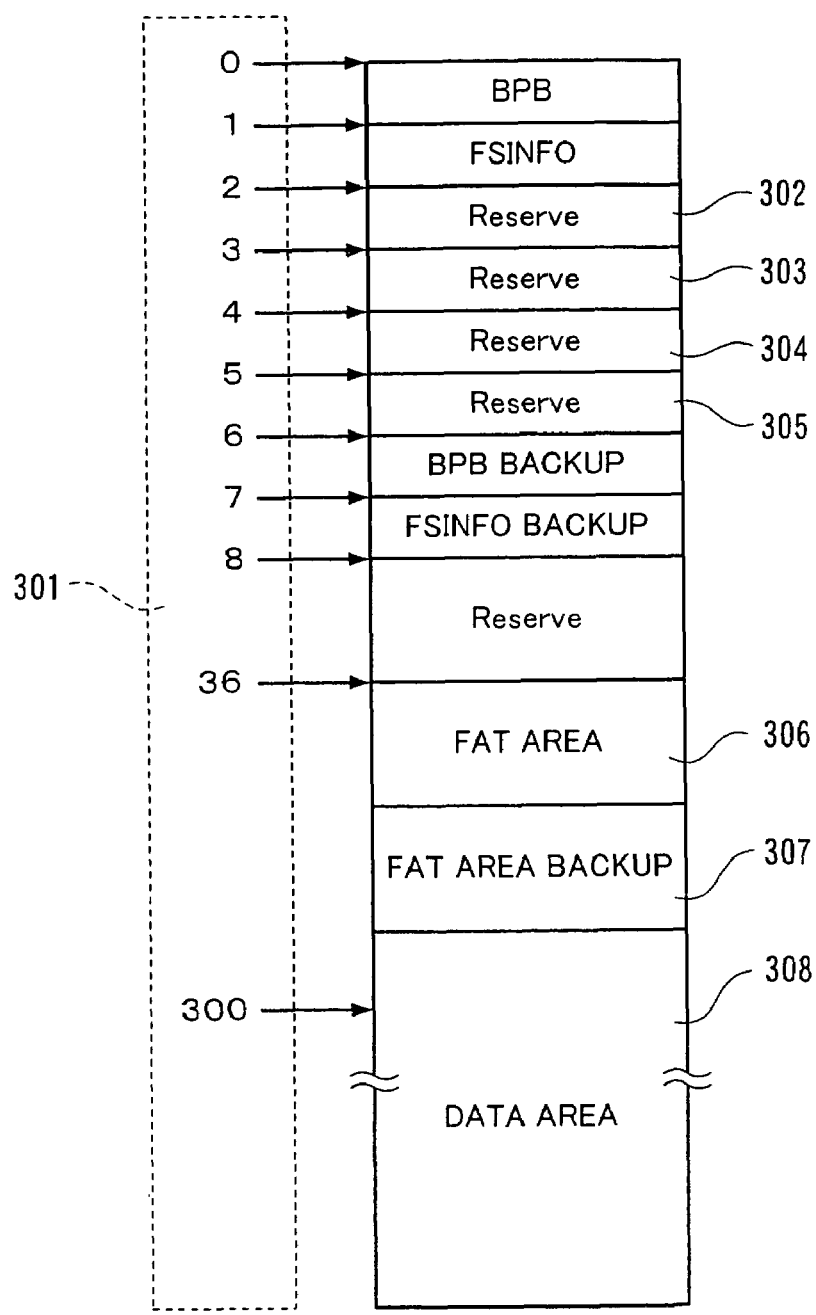
FIG. 3 is a structural drawing of the FAT file system in an HDD which illustrates a concept of the data recovery method according to the first embodiment of the present invention.

FIG. 1 is a flowchart showing a process for updating a directory entry in a FAT file system using a data recovery method according to the first embodiment of the present invention. FIG. 2 is a flowchart showing a process for recovering the directory entry in the FAT file system using the data recovery method according to the first embodiment of the present invention. FIG. 3 is a structural drawing of the FAT file system in a hard disk drive (HDD) which illustrates a concept of the data recovery method according to the first embodiment of the present invention.

In FIG. 3, reference number 301 indicates addresses assigned to recording areas in an HDD, which is a recording apparatus, 302 indicates a recording area pointed to by address 2, 303 indicates a recording area pointed to by address 3, 306 indicates a FAT area, and 308 indicates a data area. When data is recorded as a file on the HDD through the FAT file system, The FAT and directory entry must be updated, as described earlier. The FAT is recorded in the FAT area 306 in FIG. 3. Each time the FAT is updated, the same data is recorded in a FAT area backup 307 that follows the FAT area 306. In case the FAT in the FAT area 306 is corrupted, the data in the FAT area backup 307 can be used for recovery.

Described below is a recovery mechanism (backup method) provided in case a directory entry, is not duplicated as in the case of a FAT, is corrupted.

When a directory entry recorded at address "300" on the HDD in FIG. 3 is updated, address "300" on the HDD at which the directory entry to be updated is recorded is recorded in a predetermined area 302 on the HDD at step 101 in FIG. 1. At step 102, a set of directory entries in one sector that includes a directory entry including the same data as an updated version of the directory entry to be updated is recorded in a predetermined area 303 on the HDD. Finally, at step 103, the directory entry at address "300" on the HDD is updated and the backup of the directory entry ends.

If an instantaneous outage occurs due to a power failure, for example during recording or updating a file on the HDD, a directory entry can be corrupted. Therefore, the HDD is checked for a corrupted directory entry during restarting. As described earlier, if a directory entry is corrupted, the corrupted entry cannot be accessed unless it is recovered. A process for recovering a directory entry will be described below.

Address "300", which has been backed up at step 101 in FIG. 1, is read from the HDD at step 201 in FIG. 2. During the read from address "300", determination is made at step 202 as to whether or not an HDD read error has occurred. If an HDD read error has occurred, it is determined that the value address "300" was not successfully written in a area 302 on the HDD because of an instantaneous outage due to a power failure, for example during the write of the value address "300" in a area 302 on the HDD at step 101. An error correction code for correcting an error during a data read follows each sector on the HDD is recorded. If an instantaneous outage due to a failure such as a power failure occurs during writing the value, the ECC indicates a wrong value and accordingly the HDD generates a read error during the data read. A write cannot be performed in more than one area on the HDD at a time. Therefore, it can be determined that the directory entry recorded in the area pointed to by address "300" has not been corrupted. Consequently, the recovery process will end at this point.

On the other hand, if the value address "300" can be read successfully from the area 302 on the HDD, the directory entry recorded in the area pointed to by address "300" is read at step 203. At step 204, determination is made as to whether an error has occurred during reading on the HDD. If an error has occurred, it is determined that the directory entries were not written because an instantaneous outage occurred due to a power failure, for example during writing the directory entry into the HDD at step 102. Therefore, at step 205, the set of directory entries that was backed up to the HDD area 303 when the directory entry was updated at step 102 and includes the same data as an updated version of the directory entry is read from the HDD and written over the data in the area pointed to by address "300," thus recovering the directory entry.

If no read error has occurred at step 204, the directory entry recorded in the area pointed to by address "300" is not corrupted and accordingly the recovery process ends. It is assumed here that no HDD read error occurs at step 205 because step 205 is performed in consequence of a read error at step 203 and a write cannot be performed on more than one area at a time, as mentioned earlier.

As has been described, the first embodiment has an advantage that a directory entry can readily be recovered if a write of the directory entry on the HDD has failed due to an unexpected abort of updating of the directory entry because the address at which that directory is recorded and a directory entry containing the same data as an updated version of the directory entry to be updated are backed up to a predetermined area before the directory entry is updated.

While in the first embodiment the address at which a directory entry is recorded and a directory entry containing the same data as an updated version of the directory entry to be updated are backed up to two different areas 302 and 303, the backup of the directory entry and the backup of the address can be recorded in the same area if the effective size of a set of directory entries is smaller than the minimum recording unit such as a sector of the storage device. In that case, the backup of the directory entry is copied to the area in which the directory entry is recorded at step 205 while the backup of the directory is being read from the HDD at step 201. This provides an additional advantage that the operation at step 205 can be simplified to achieve a faster recovery process.

Also in this case, steps 101 and 102 in the directory backup process in FIG. 1 can be performed at a time. Thus, the backup process can be performed faster.

The present embodiment has been described with respect to the directory entry backup and recovery methods, the present invention is also applicable to file information or data besides directory entries.

Furthermore, the present embodiment has been described with respect to a FAT file system, the present invention is also applicable to a file system having management data equivalent to a FAT and directory entries.

While the present embodiment has been described which uses an HDD as a storage device, the present invention is also applicable to a storage device having other recording media such as a magnetic disk, semiconductor memory, magneto-optical disk, or optical disk.

Second Embodiment

A data recovery method according to a second embodiment of the present invention will be described. As in the first embodiment, a process for updating a directory entry recorded at address "300" shown in FIG. 3 will be described with reference to FIG. 4.

Figure 4:
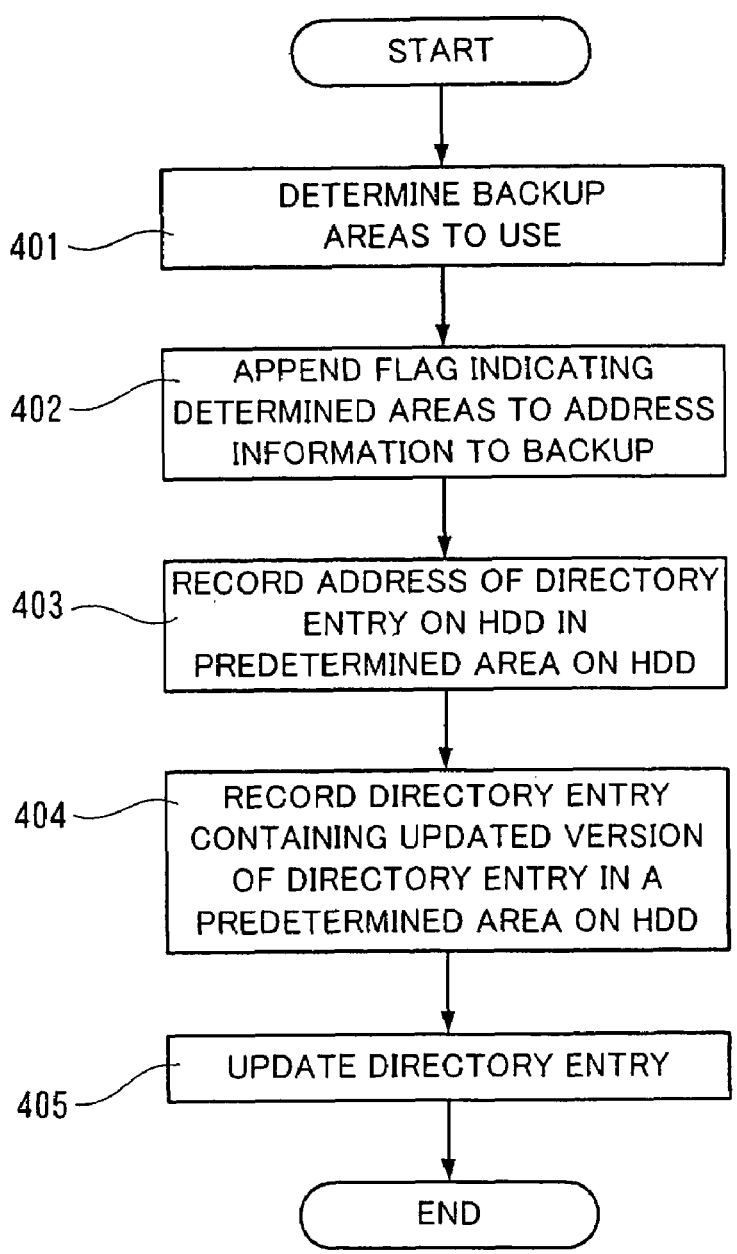
FIG. 4 is a flowchart showing a process for updating a directory entry in a FAT file system using a data recovery method according to a second embodiment of the present invention.

FIG. 4 is a flowchart showing a process for updating a directory entry in a FAT file system using a data recovery method in which a number of backup areas are provided according to the second embodiment.

Determination is first made at step 401 as to which of a set of areas 302 and 303 and a set of areas 304 and 305 in FIG. 3 should be used as backup areas. Serial numbers 0 to 9 are provided and serial number 0 is used for the first backup operation. The serial number is incremented each time a backup of a directory entry and a backup of its address are written into backup areas. When the serial number reaches 9, it is reset to 0 and the backup process is repeated. For example, if the serial number is even, then areas 302 and 303 are chosen to be used as backup areas. If it is odd, then areas 304 and 305 are chosen.

The serial number used at step 401 is added to backup data of the address at step 402. The address backup data with the serial number added and backup data of a set of directory entries containing data that a directory to be updated will contain if it is updated are recorded in an HDD at steps 403 to 405.

Steps 403 to 405 are similar to steps 101 to 103 described with respect to the first embodiment and shown in FIG. 1 and therefore description of which will be omitted.

A process for recovering a directory entry will be described below.

Figure 5:
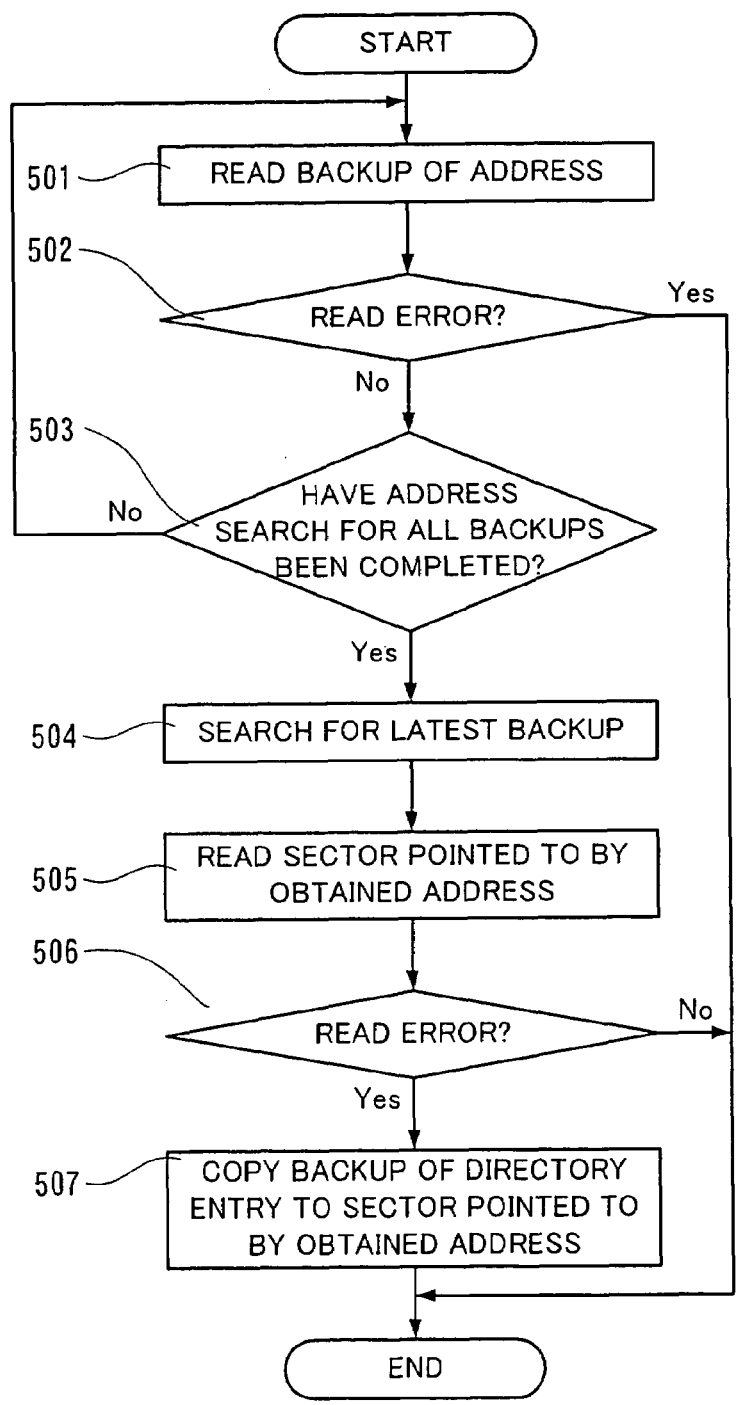
FIG. 5 is a flowchart showing a process for recovering the directory entry in the FAT file system using the data recovery method according to the second embodiment of the present invention.

FIG. 5 is a flowchart showing the method for recovering the directory entry in a FAT file system when a plurality of backup areas are provided based on data recovery method according to the second embodiment.

At step 501 in FIG. 5, the address backed up at step 403 in FIG. 4 is read from area 302. During the read, determination is made at step 502 as to whether or not an HDD read error has occurred. If an HDD read error has occurred, it is determined that address data has not successfully written on the HDD because an instantaneous outage has occurred due to a power failure, for example during writing the address on the HDD at 403. At step 503, determination is made as to whether or not read from all address backup areas has been completed. If not, a backup address is read from the next address backup area 304. Again, determination is made at step 502 as to whether or not an HDD read error has occurred. If so, it is determined that the address data has not been successfully written in consequence of an instantaneous outage has occurred due to a power failure, for example during writing the address on the HDD at step 403.

If it is determined at step 503 that read from all address backup areas has been completed, the latest data is selected from backup areas 302 and 303. The data with the largest serial number assigned at step 402 is regarded as the latest data. However, if serial number 0 exists, the other backup areas are searched for serial number 1 and, if serial number 1 is not found, the data with serial number 0 is regarded as the latest. Based on the backup of the latest address obtained, recovery of the directory entry is performed at steps 505 to 507.

Steps 505 to 507 are similar to steps 203 to 205 in FIG. 2 described with respect to the first embodiment and therefore description of which is omitted.

As has been described, the second embodiment has an advantage that a directory entry can readily be recovered and the results of update of more than one directory entry can be seen even if a write of the directory entry on the HDD has failed due to an unexpected abort of updating of the directory entry because the address at which that directory entry is recorded and a directory entry containing the same data as an updated version of the directory entry to be updated are sequentially backed up to predetermined multiple areas before the directory entry is updated.

In the embodiment, backup is sequentially performed to different pairs of backup areas, 302 and 303 or 304 and 305 in FIG. 3, each time a directory entry is updated. However, it is further advantageous if addresses are sequentially written in different backup areas only when the addresses at which directory entries to be updated are changed; otherwise they are written over the addresses in the same backup area. Thus, directory entries in more than one areas can be recovered because the final update results for individual addressees are written in the backup areas.

While in the embodiment the address at which a directory entry is recorded and a directory entry containing data the directory entry would contain after it is updated are backed up to different areas 302 and 303 or areas 304 and 305, the backup of the directory entry and the backup of the address can be recorded in the same area if the effective size of a set of directory entries is smaller than the minimum recording unit such as a sector of the storage device. In that case, the backup of the directory entry is copied to the area in which the directory entry is recorded at step 507 while the backup of the directory entry is being read from the HDD at step 501. This provides an additional advantage that the operation at step 505 can be simplified to achieve a faster recovery process.

Also in this case, steps 403 and 404 in the directory backup process in FIG. 4 can be performed at a time. Thus, the backup process can be performed faster.

Third Embodiment

A data recovery method and a data recording apparatus according to a third embodiment of the present invention will be described.

Figure 6:
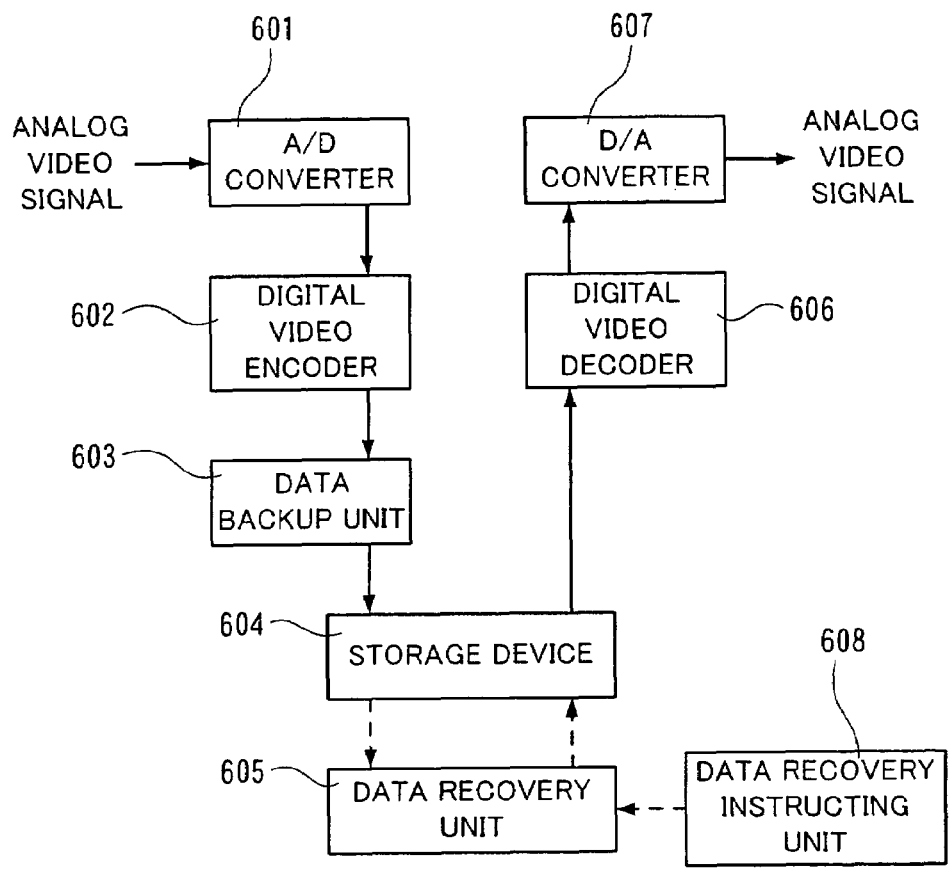
FIG. 6 is a block diagram showing a configuration of a video recorder/player implementing a data recovery method and a data recording apparatus according to a third embodiment of the present invention.
Figure 7:
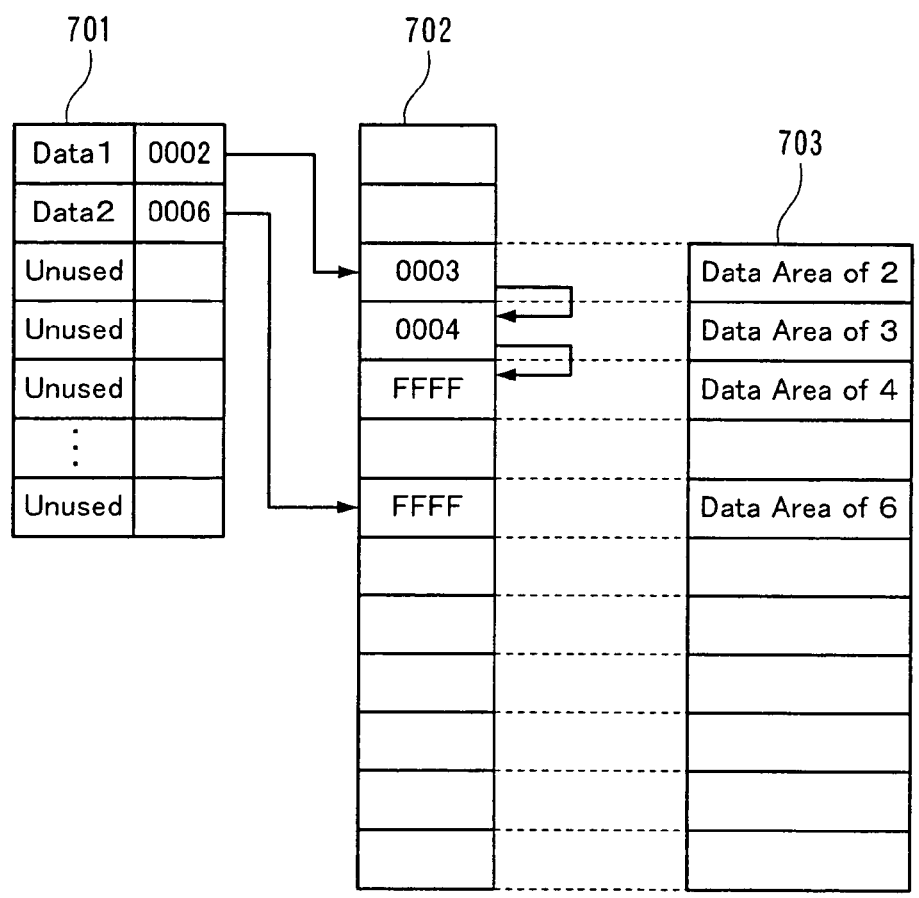
FIG. 7 is a structural drawing of a FAT file system in an HDD which shows a concept of a data recovery method according to an prior art.

FIG. 6 is a block diagram showing a configuration of a video recorder/player which implements a data recovery method and data recording apparatus according to the third embodiment. In FIG. 6, reference number 601 denotes an A/D converter, 602 denotes a digital video encoder, 603 denotes a data backup unit, 604 denotes a storage device, 605 denotes a data recovery unit, 606 denotes a digital video decoder, 607 denotes a D/A converter, and 608 denotes a data recovery instructing unit.

Normal recording and reproduction operations will be described first.

During recording, an analog video signal inputted is converted by the A/D converter 601 into a digital video signal. The digital video signal converted by the A/D converter 601 is provided to the digital video encoder 602, where it is encoded and compressed. Directory entries are backed up by the data backup unit 603 and recorded in the storage device 604 as described with respect to the first and second embodiments.

During reproduction, a encoded and compressed digital video signal is read from the storage device 604 and provided to the digital video decoder 606. The digital video signal decoded by the digital video decoder 604 is converted by the D/A converter 607 into an analog video signal and the analog signal is outputted.

A data recovery process will be described below.

When an instruction to recover data is provided from the data recovery instructing unit 608, the data recovery unit 605 performs data recovery based on backup data stored in the storage device 604 as described with respect to the fist and second embodiments.

The third embodiment has an advantage that a data recording apparatus which allow a directory entry to be readily recovered if write of the directory entry into the storage device 604 has failed due to an unexpected outage during update of the directory entry can be implemented by a video recorder/player configured with an A/D converter 601 for converting an analog signal into a digital signal, a digital video encoder 602 for encoding and compressing a digital video signal, a data backup unit 603 for performing backup of directory entries, a storage device 604 for storing compressed digital video data, a data recovery unit 605 for performing recovery of digital video data, a data recovery instructing unit 608 for instructing to perform data recovery, a digital video decoder 606 for decoding digital video data, and a D/A converter 607 for converting a digital video signal into an analog video signal.

While the present embodiment has been described with respect to a video recorder/player as an example of an apparatus using the data recovery method, the present embodiment can also be applied to any apparatus, besides an digital audio/video apparatus like the video recorder/player, that records data on a recording medium such as a semiconductor memory, magnetic disk, a magneto-optical disk, or an optical disk through a file system including management data equivalent to a FAT and directory entries.

What is claimed is:

1. A data recovery method for recovering data recorded as a file on a storage device, comprising the steps of:

managing a file recorded on the storage device by using a plurality of pieces of data constituting the file, file information including a file name and information about the location in which starting data of said data in the storage device, and a table for identifying the order of said data;

before the file is updated, recording in a predetermined area of the storage device the address of said file information in the storage device and information including an updated version of said file information;

when the storage device is restarted, reading the address from said predetermined area in the storage device which has been recorded on the storage device before the update of the file information;

determining whether or not the address has been successfully read;

reading data recorded in an area on the storage device that is pointed to by said address;

determining whether or not said data has been successfully read; and overwriting said area pointed to by said address in the storage device with the information including said updated version of said file information recorded on the storage device to recover said file information.

2. The data recovery method according to claim 1, wherein the recovery of said file information is performed for restart of the storage device only when the storage device is shut down following an improper procedure including an outage during the previous write of the file information.

3. The data recovery method according to claim 2, wherein the address of said file information in said storage device and said information including the updated version of the file information are stored in predetermined different areas of the storage device.

4. Data recovery method according to claim 3, wherein as the step of recording in said predetermined areas of the storage device the address of said file information in said storage device and said information including the updated version of the file information before said file information is updated, said predetermined areas are overwritten with said address and said updated version of the file information, each time the file information is updated.

5. The data recovery method according to claim 4, wherein said step of overwriting said predetermined areas overwrites a plurality of areas with said address and said information including said updated version of the file information in an orderly manner.

6. The data recovery method according to claim 1, wherein said predetermined areas are the minimum recording unit of said storage device.

7. The data recovery, method according to claim 6, wherein said storage device is any of a semiconductor memory, a magnetic disk, a magneto-optical disk, and an optical disk.

8. The data recovery method according to claim 7, wherein said step of determining whether or not said address or data has been successfully read uses an error handling capability of the storage device.

9. The data recovery method according to claim 6, wherein said step of determining whether or not said address or data has been successfully read uses an error handling capability of the storage device.

10. The data recovery method according to claim 1, wherein said storage device is any of a semiconductor memory, a magnetic disk, a magneto-optical disk, and an optical disk.

11. The data recovery method according to claim 10, wherein said step of determining whether or not said address or data has been successfully read uses an error handling capability of the storage device.

12. The data recovery method according to claim 1, wherein said step of determining whether or not said address or data has been successfully read uses an error handling capability of the storage device.

13. A data recording apparatus that recovers data recorded as a file on a storage device, comprising:

a data backup unit which manages the file recorded on the storage device by using a plurality of pieces of data constituting the file, file information including a file name and information about the location in which starting data of said data in the storage device, and a table for identifying the order of said data, and at the time of updating the file, records in a predetermined area of the storage device the address of said file information, before the file is updated, in the storage device and information including an updated version of said file information; and a data recovery instructing unit which, in response to detecting that the storage device is restarted, reads the address from said predetermined area in the storage device which has been recorded on the storage device before the update of the file information, determines whether or not the address has been successfully read, reads data recorded in an area on the storage device that is pointed to by said address, determines whether or not said data has been successfully read, and overwrites said area pointed to by said address in the storage device with the information including said updated version of said file information recorded on the storage device to recover said file information.

14. The data recording apparatus according to claim 13, wherein said data recovery instructing unit issues an instruction to perform the recovery of said file information is performed for the restart of the storage device only when the storage device is shut down following an improper procedure including an outage during the previous write of the file information.

15. The data recording apparatus according to claim 14, wherein said data backup unit stores the address of said file information in said storage device and said information including the updated version of the file information into predetermined different areas of the storage device.

16. The data recording apparatus according to claim 15, wherein said data backup unit records, before said file information is updated, the address of said file information in said storage device and said information including the updated version of the file information, by overwriting said areas with said address and said updated version of the file information in said predetermined areas, each time the file information is updated.

17. The data recording apparatus according to claim 16, wherein said data backup unit overwrites a plurality of predetermined areas with said address and said information including said updated version of the file information in an orderly manner.

18. The data recording apparatus according to claim 13, wherein said predetermined areas are the minimum recording unit of said storage device.

19. The data recording apparatus according to claim 18, wherein said storage device is any of a semiconductor memory, a magnetic disk, a magneto-optical disk, and an optical disk.

20. The data recording apparatus according to claim 13, wherein said step of determining whether or not said address or data has been successfully read uses an error handling capability of the storage device.

21. The data recording apparatus according to claim 18, wherein said step of determining whether or not said address or data has been successfully read uses an error handling capability of the storage device.

22. The data recording apparatus according to claim 13, wherein said storage device is any of a semiconductor memory, a magnetic disk, a magneto-optical disk, and an optical disk.

23. The data recording apparatus according to claim 22, wherein said step of determining whether or not said address or data has been successfully read uses an error handling capability of the storage device.

24. The data recording apparatus according to claim 19, wherein said step of determining whether or not said address or data has been successfully read uses an error handling capability of the storage device.

* * * * *